(12) United States Patent
Kondapalli et al.

(10) Patent No.: US 8,218,748 B2
(45) Date of Patent: Jul. 10, 2012

(54) TELEPHONE CALL CHAINING

(75) Inventors: Chakradhar Kondapalli, Hyderabad (IN); Sudha Kalyan Kowtha, Hyderabad (IN); James Scott Hiscock, Rockport, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1160 days.

(21) Appl. No.: 11/524,763

(22) Filed: Sep. 21, 2006

(65) Prior Publication Data
US 2008/0043963 A1    Feb. 21, 2008

(30) Foreign Application Priority Data
Jul. 24, 2006    (IN) .......................... 1689/DEL/2006

(51) Int. Cl.
*H04M 3/42* (2006.01)
*H04M 3/56* (2006.01)
*H04N 7/15* (2006.01)
*H04L 12/18* (2006.01)
*G06F 15/16* (2006.01)

(52) U.S. Cl. ................. 379/201.02; 348/14.08; 370/261; 370/262; 379/203.01; 379/204.01; 379/205.01; 379/210.01; 379/211.03; 455/416

(58) Field of Classification Search ............... 379/88.25, 379/201.02, 212.01, 211.03, 220.01, 221.05, 379/221.08, 265.04, 265.09, 211.01–211.04, 379/210.01; 370/230; 455/417, 422.1; 704/275
See application file for complete search history.

(56) References Cited

U.S. PATENT DOCUMENTS

| | | | | |
|---|---|---|---|---|
| 5,329,581 A * | 7/1994 | Friedes et al. | ............ | 379/93.14 |
| 5,416,834 A | 5/1995 | Bales et al. | | |
| 5,487,111 A * | 1/1996 | Slusky | ..................... | 379/211.03 |
| 5,506,890 A * | 4/1996 | Gupta et al. | ............... | 379/88.25 |
| 5,537,608 A * | 7/1996 | Beatty et al. | .................. | 379/158 |
| 5,546,442 A * | 8/1996 | Foladare et al. | ............. | 455/417 |
| 5,924,070 A * | 7/1999 | Ittycheriah et al. | ........... | 704/275 |
| 5,946,386 A * | 8/1999 | Rogers et al. | ............. | 379/265.09 |
| 5,949,869 A * | 9/1999 | Sink et al. | ................ | 379/221.05 |
| 6,049,602 A * | 4/2000 | Foladare et al. | ......... | 379/265.04 |
| 6,072,867 A * | 6/2000 | Lieuwen | .................. | 379/220.01 |
| 6,374,102 B1 * | 4/2002 | Brachman et al. | ......... | 455/422.1 |
| 6,453,023 B1 | 9/2002 | McKee | | |
| 6,917,673 B2 * | 7/2005 | Sawada et al. | ........... | 379/201.02 |
| 6,920,214 B1 * | 7/2005 | Sbisa et al. | ............... | 379/221.08 |
| 7,088,810 B1 * | 8/2006 | Burg | ........................ | 379/201.02 |
| 2002/0118800 A1 * | 8/2002 | Martinez et al. | ............. | 379/67.1 |
| 2004/0264653 A1 | 12/2004 | Revisky et al. | | |
| 2006/0029189 A1 | 2/2006 | Patel et al. | | |
| 2006/0227957 A1 * | 10/2006 | Dolan et al. | ............. | 379/212.01 |
| 2006/0268698 A1 * | 11/2006 | Shaffer et al. | ................. | 370/230 |

FOREIGN PATENT DOCUMENTS

| WO | WO 98/48559 | 10/1998 |
|---|---|---|
| WO | WO 01/89250 A1 | 11/2001 |

* cited by examiner

*Primary Examiner* — Harry Hong

(57) ABSTRACT

A telephone system connects a user to a plurality of telephone call participants in a sequence of calls referred to as a "call chain." Features of each call in the chain, such as the telephone number(s) of the participant(s) to be called and the scheduled duration of the call, may be stored in a computer-readable record. A first telephone call is established between the user and the first participant in the call chain. The first telephone call may be terminated automatically by the system upon expiration of a predetermined maximum duration or when the first participant hangs up the telephone. Upon termination of the first telephone call, a second telephone call is established between the user and the second participant in the call chain. A third and subsequent telephone calls may be established between the user and the subsequent participants in the call chain in the same manner.

39 Claims, 6 Drawing Sheets

US 8,218,748 B2

TELEPHONE CALL CHAINING

BACKGROUND

This application claims priority under 35. U.S.C. §119 from co-pending and commonly-owned Indian Pat. App. Ser. No. 1689/DEL/2006, filed on Jul. 24, 2006, and entitled "Telephone Call Chaining."

1. Field of the Invention

The present invention relates to telephony and, more particularly, to managing chains of telephone calls among multiple parties.

2. Related Art

Modern telephone systems provide a wealth of features far beyond those available in the networks of standalone rotary-dial telephones of yesterday. Even relatively simple and inexpensive telephones for use in homes provide the ability to store telephone numbers and then retrieve and dial them at the touch of a button ("speed dialing"), view previously-dialed telephone numbers and the telephone numbers of previously-received calls, and store telephone messages in multiple voice mailboxes. Businesses that use Private Branch Exchanges (PBXs) are able to provide their users with even more sophisticated features, such as the ability to participate in conference calls, forward messages to other users, and transfer incoming calls directly to voicemail or to an external telephone number (such as that associated with a cell phone).

SUMMARY

A telephone system connects a user to a plurality of telephone call participants in a sequence of calls referred to as a "call chain." Features of each call in the chain, such as the telephone number(s) of the participant(s) to be called and the scheduled duration of the call, may be stored in a computer-readable record. A first telephone call is established between the user and the first participant in the call chain. The first telephone call may be terminated automatically by the system upon expiration of a predetermined maximum duration or when the first participant hangs up the telephone. Upon termination of the first telephone call, a second telephone call is established between the user and the second participant in the call chain. A third and subsequent telephone calls may be established between the user and the subsequent participants in the call chain in the same manner.

For example, one embodiment of the present invention is directed to a method including: (A) identifying a sequence of phone call participants; (B) identifying a first phone call between a user and a first one of the phone call participants in the sequence; (C) identifying a first termination event associated with the first phone call; (D) identifying a second one of the phone call participants, wherein the second one follows the first one in the sequence; and (E) attempting to initiate a second phone call between the user and the second one of the phone call participants.

Another embodiment of the present invention is directed to an apparatus including: first phone call participant identification means for identifying a sequence of phone call participants; first phone call identification means for identifying a first phone call between a user and a first one of the phone call participants in the sequence; first termination event identification means for identifying a first termination event associated with the first phone call; second phone call participant identification means for identifying a second one of the phone call participants, wherein the second one follows the first one in the sequence; and first phone call initiation means for attempting to initiate a second phone call between the user and the second one of the phone call participants.

Yet another embodiment of the present invention is directed to a method including: (A) identifying a sequence of phone call participants; (B) identifying a first phone call between a user and a first one of the phone call participants in the sequence; (C) identifying a first termination event associated with the first phone call; (D) identifying a first person who is not one of the phone call participants in the sequence; and (E) attempting to initiate a second phone call between the user and the first person.

A further embodiment of the present invention is directed to an apparatus including: phone call participant identification means for identifying a sequence of phone call participants; phone call identification means for identifying a first phone call between a user and a first one of the phone call participants in the sequence; termination event identification means for identifying a first termination event associated with the first phone call; person identification means for identifying a first person who is not one of the phone call participants in the sequence; and phone call initiation means for attempting to initiate a second phone call between the user and the first person.

Yet a further embodiment of the present invention is directed to a computer-implemented method including.: (A) identifying a sequence of phone call participants; (B) identifying a first phone call between a user and a first phone call participant; (C) in response to an event occurring during the first phone call, selecting a second phone call participant; (D) identifying a first termination event associated with the first phone call; (E) attempting to initiate a second phone call between the user and the second phone call participant.

Still a further embodiment of the present invention is directed to an apparatus including: phone call participant identification means for identifying a sequence of phone call participants; phone call identification means for identifying a first phone call between a user and a first phone call participant; phone call participant selection means for selecting, in response to an event occurring during the first phone call, a second phone call participant; termination event identification means for identifying a first termination event associated with the first phone call; and phone call initiation means for attempting to initiate a second phone call between the user and the second phone call participant.

Other features and advantages of various aspects and embodiments of the present invention will become apparent from the following description and from the claims.

DETAILED DESCRIPTION

Figure 1:
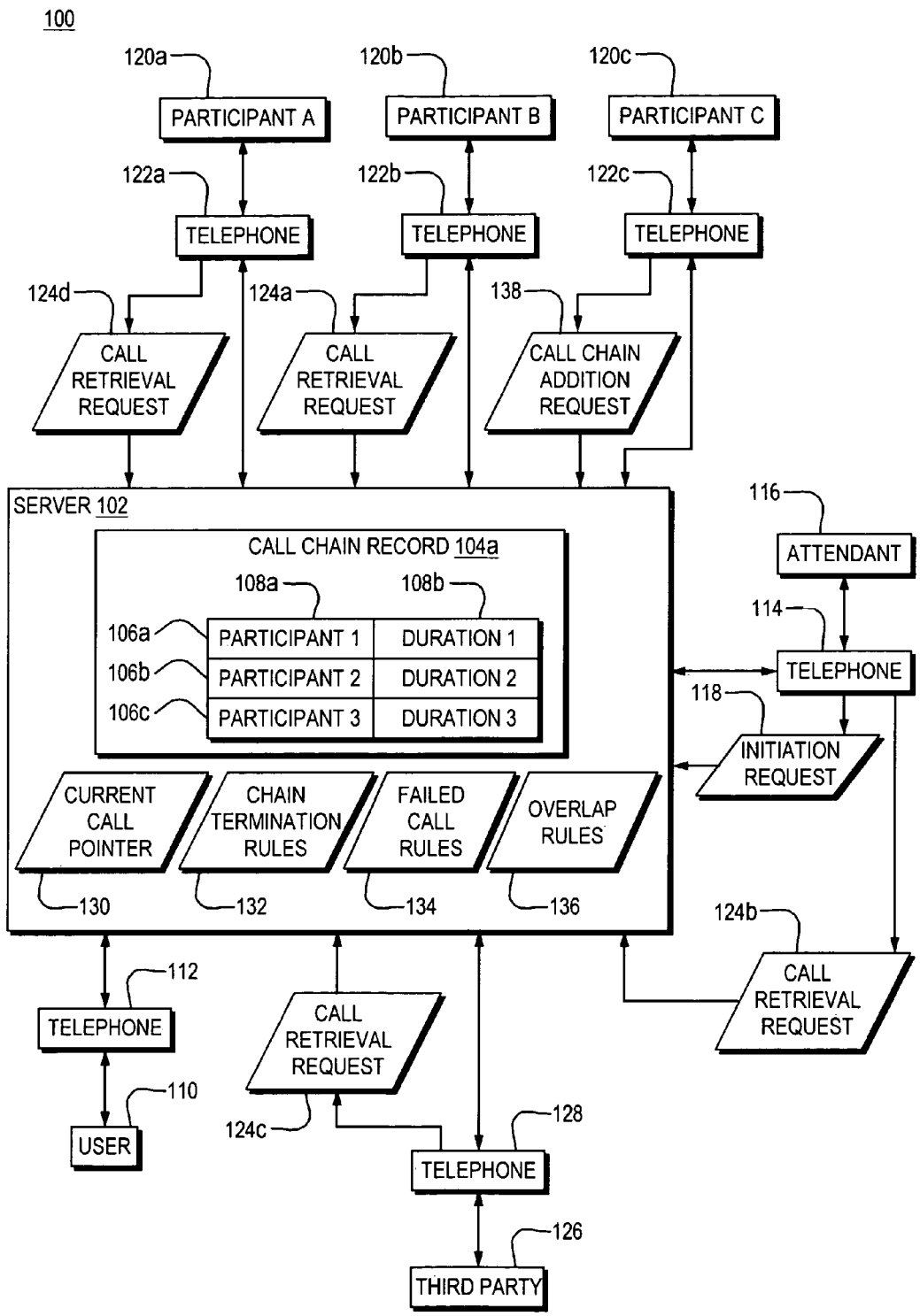
FIG. 1 is a block diagram of a system for configuring and executing a call chain according to one embodiment of the present invention.

Various embodiments of the present invention enable a user of a telephone system to engage in a sequence of telephone calls with other users. Such a sequence of telephone calls is referred to herein as a "call chain," and the process of establishing a call chain is referred to herein as "call chaining."

As an example, consider a case in which the user is a job applicant who is scheduled to hold a sequence of job interviews by telephone with interviewers A, B, and C. In a conventional telephone system, some person (such as a receptionist) would be responsible for manually maintaining a list of the interviewers A, B, and C, and their respective telephone numbers. The person responsible for managing such a sequence of telephone calls is referred to herein as an "attendant." The attendant might also be responsible for maintaining a schedule indicating, for example, that the applicant is to speak with interviewer A from 1:00 pm-1:30 pm, with interviewer B from 1:30 pm-1:45 pm, and with interviewer C from 1:45 pm-2:00 pm.

Managing such a call chain using a conventional telephone system can be tedious, time-consuming, and error prone. For example, the scheme described above relies significantly on the availability and attentiveness of the attendant for its success. If the applicant calls the attendant at the scheduled start time of the call chain (e.g., 1:00 pm) and the attendant is not present to take the call, it may not be possible to initiate the call chain because all information about the call chain resides with the attendant.

Furthermore, even if the attendant is present to take the call from the applicant, the attendant must find all information associated with the call chain, such as the list of participants and their telephone numbers and scheduled interview times. If the attendant fails to locate any of this information, the call chain may be delayed or prevented from moving forward.

Even if the attendant locates all of the information associated with the call chain, the attendant must still manually manage the call chain. For example, when the applicant calls the attendant, the attendant must dial the telephone number of participant A and wait for participant A to pick up the telephone to ensure that the applicant is connected to participant A. This step of the process may fail or be delayed if the attendant misdials participant A's telephone number. Furthermore, the attendant may need to wait on the telephone line until the applicant is connected successfully to participant A, thereby making the attendant unavailable to perform other tasks.

Even if the attendant successfully connects the applicant to participant. A, additional manual steps may be required to ensure that the applicant is connected successfully to additional links (participants) in the call chain. For example, when the applicant's interview with participant A is complete, the applicant's telephone call with participant A needs to be terminated, and the applicant needs to be connected to participant B (the next link in the call chain).

Problems may be encountered in the attempt to make this connection from the applicant to participant B. For example, although the applicant may know that his next interview is with participant B, the applicant may not know participant B's telephone number. Participant A may not know that participant B is the next link in the chain, or may not know or have easy access to participant B's telephone number. Even if the applicant and/or participant A know participant B's telephone number, it may be an inefficient use of participant A's time to require participant A to dial participant B's telephone number, wait for participant B to answer, and take other action if participant B fails to answer.

As a result, the responsibility for connecting the applicant to participant B may be placed with the attendant. Recall, however, that the attendant has been disconnected from the applicant since establishing the call between the applicant and participant A. Therefore, requiring the attendant to connect the applicant to participant B is fraught with opportunities for error and delay. For example, upon completion of the interview between the applicant and participant A, participant A may transfer the applicant back to the attendant. The attendant, however, may fail to pick up the call for any number of reasons. For example, even if the attendant was prepared to connect the applicant to participant B at a predetermined time (e.g., 2:00 pm), the interview between the applicant and participant A may end earlier than scheduled, at which time the attendant may be unavailable to connect the applicant to participant B. In such an event, it may become difficult or impossible to connect the applicant to the next link in the call chain.

Even if the applicant is successfully reconnected to the attendant, the attendant must then successfully connect the applicant to the next link in the call chain (in this case, participant B). At this point, any of the difficulties described above may be encountered.

Another problem with such manually-managed call chains is that it can be difficult for someone outside of the chain to join an existing call in the chain. For example, if the president of the company wishes to speak to the job applicant while the applicant is being interviewed by participant B, it may be difficult for the president to do so. First, the president must identify the person to whom the applicant is currently speaking. To do this, the president may need to contact the attendant, who then attempts to identify the person to whom the applicant is currently speaking. This might not be possible if, for example, participant A chose to connect the applicant directly to participant B, bypassing the attendant.

Second, even if the president correctly identifies the person to whom the applicant is currently speaking, the president must join the call. Assume for purposes of example that the applicant is currently speaking to participant B. The president may need to identify participant B's telephone number, call participant B directly, and ask participant B to create a conference call among the applicant, participant B, and the president. This is tedious and time-consuming.

These and other problems become more and more burdensome and likely to occur as the number of links in the chain increases and as the attendant is made responsible for managing an increasing number of contemporaneous call chains. Additional difficulties may be encountered if the call chain is more complicated, such as in the case where one link in the chain involves a call between two participants and another link in the chain involves a call among three participants.

Embodiments of the present invention address these and other problems by providing techniques for automating the process of configuring and executing call chains. For example, the features of a particular call chain (such as the telephone numbers of participants in the chain and the sequence and scheduled durations of the calls in the chain) may be stored in a computer-readable record. A computer system may use the call chain record to automatically establish telephone calls between a user (such as the job applicant described above) and the participants in the call chain in the sequence indicated in the record.

Figure 2:
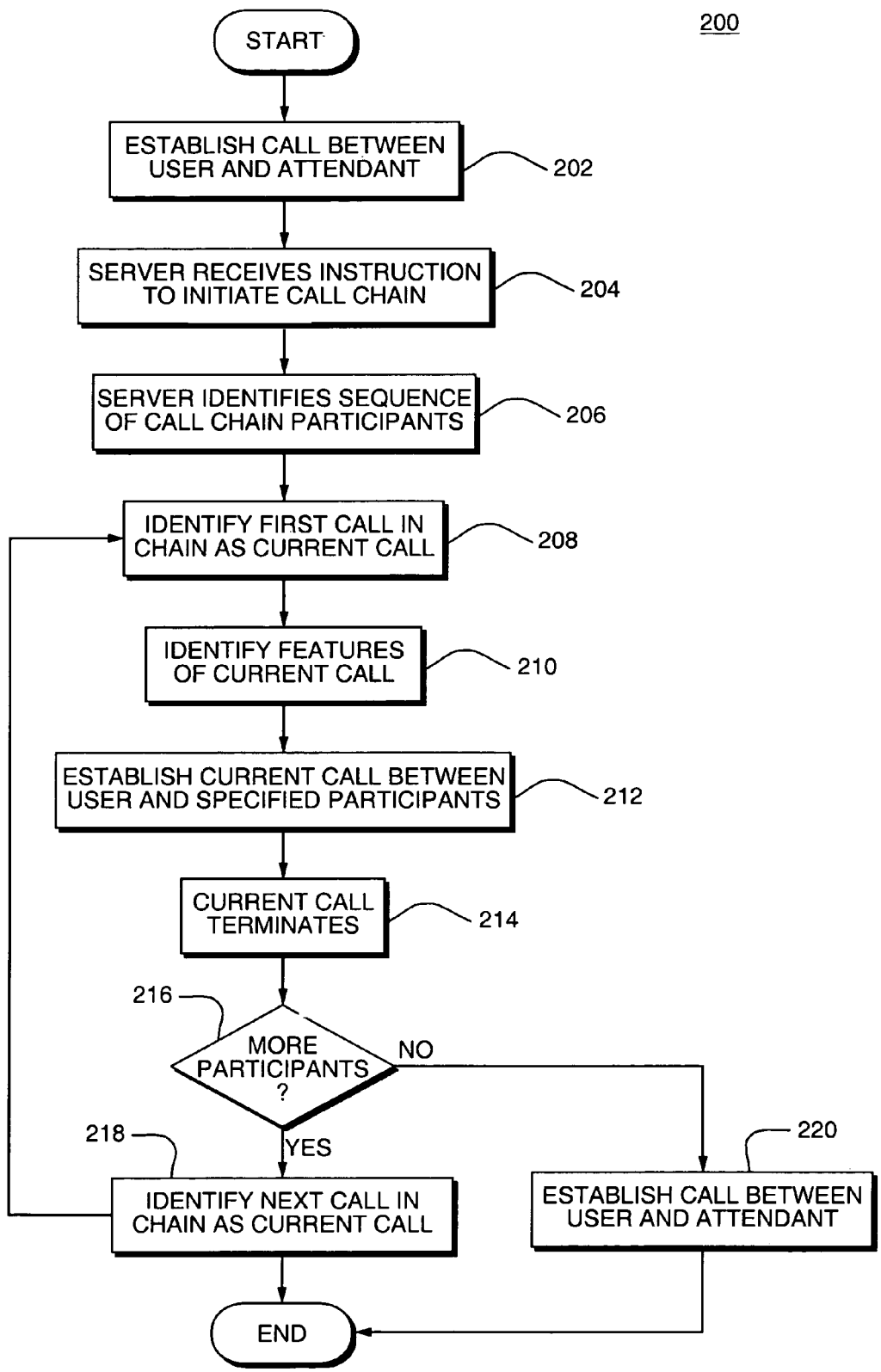
FIG. 2 is a flow chart of a method performed by the system of FIG. 1 to configure and execute a call chain according to one embodiment of the present invention.

For example, referring to FIG. 1, a block diagram is shown of a system 100 for configuring and executing a call chain according to one embodiment of the present invention. Referring to FIG. 2, a flow chart is shown of a method 200 performed by the system of FIG. 1 to configure and execute a call chain according to one embodiment of the present invention.

The system 100 includes a server 102, which may, for example, be a 3Com® NBX® or VCX™ server. The server 102 includes a call chain record 104a which stores information about features of a particular call chain. In the particular example shown in FIG. 1, the call chain record 104a includes three call schedule records 106a-c. The call schedule records 106a-c define features of the call chain, such as the participants 108a and durations 108b of the calls in the chain.

To further explain the structure and function of the call chain record 104a, consider an example in which a user 110 uses a telephone 112 to place a call to an attendant 116 at telephone 114 (FIG. 2, step 202). Alternatively, the attendant 116 may call the user 110 to establish a call between the attendant 116 and the user 110.

Figure 3A:
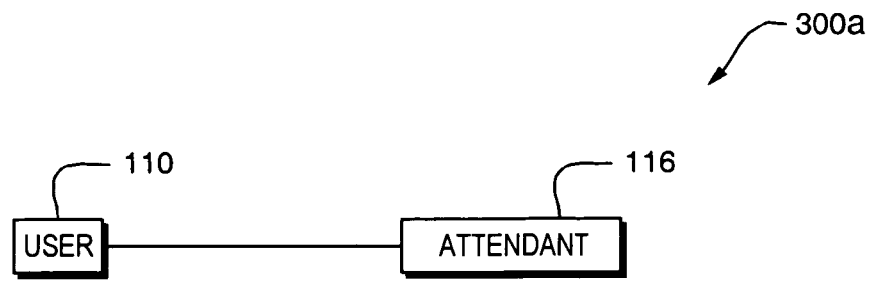
FIGS. 3A-3E are diagrams illustrating the states of calls in a call chain while the call chain is being executed according to one embodiment of the present invention.

Referring to FIG. 3A, a diagram 300a is shown illustrating the state of the call chain after performance of step 202 in FIG. 2. At this point, the user 110 is connected to the attendant 116.

Assume again that the user 110 is a job applicant scheduled to hold a chain of interviews with participants A 120a, B 120b, and C 120c. The user 110 may introduce himself to the attendant 116, who may identify that the user 110 is scheduled to participate in the call chain defined by call chain record 104a. For example, the telephone 114 and/or a computer coupled to the server 102 may enable the attendant 116 to view a list of current call chains having records defined in the server 102. Note that although only one call chain record 104a is shown in FIG. 1 for purposes of example, the server 102 may include any number of call chain records.

The attendant 116 may select the call chain record 104a and provide a call chain initiation command 118 to the server 204 (step 204). The telephone 114 and/or computer may enable the attendant to provide the command 118 by, for example, selecting the name of a particular call chain and pressing a predetermined button. The initiation command 118 may, however, be provided to the server 102 in other ways. For example, the server 102 may provide the user 110 with voice prompts to which the user 110 may respond and thereby select the call chain record 104a. As yet another alternative, the participant A 120a or other participant in the call chain may provide the initiation command 118 to the server 102.

In response to receiving the initiation command 118, the server 102 initiates the call chain defined by the selected call chain record 104a. The server 102 identifies the sequence of participants in the call chain (step 206). The server 102 may identify the sequence of participants by reference to the call chain record 104a. Assume for purposes of the following discussion that the first participant 108a specified by record 106a is Participant A 120a, that the second participant 108a specified by record 106b is Participant B 120b, and that the third participant 108a specified by record 106c is Participant C 120c.

The sequence of the call schedule records 106a-c may specify the sequence and duration of calls to be made in the call chain. In other words, the server 102 may interpret the call chain record 104a to specify that the user 110 is to be connected first to Participant A 120a (through telephone 122a) for the duration 108b specified by record 106a, then connected to Participant B 120b (through telephone 122b) for the duration 108b specified by record 106b, and then connected to Participant C 120c (through telephone 122c) for the duration 108b specified by record 106c.

Figure 4A:
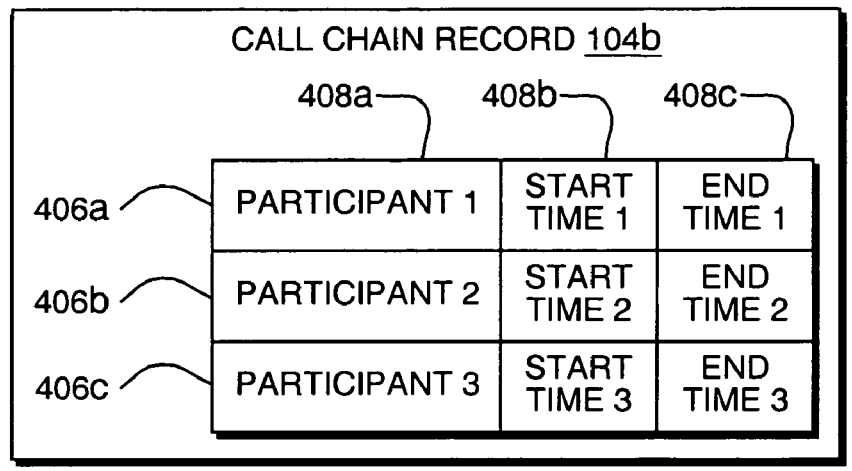
FIGS. 4A-4C are diagrams of embodiments of call chain records according to various embodiments of the present invention.

Alternatively, for example, each of the call schedule records 106a-c in the call chain record 104a may specify a particular start and end time, rather than merely a duration. For example, referring to FIG. 4A, another embodiment of a call chain record 104b is shown, in which each of the call schedule records 406a-c specifies a participant 408a, a start time 408b, and an end time 408c. In such a case, the specified start and end times of each call, rather than the sequence of the records 406a-c, determines the sequence of calls in the call chain. Note that these are merely examples of ways in which features of a call chain may be stored in a call chain record, and in which the server 102 may identify the sequence of phone call participants in a call chain.

The server 102 identifies the first call specified by the call chain record 104a as the "current" call in the chain (step 208). Assume for purposes of the following discussion that call schedule record 106a identifies the first call in the call chain. The server 102 may update a current call pointer 130 in the call chain record 104a to point to the call schedule record 106a and/or to store other information about the state of the current call. The server 102 uses the call schedule record for the current call (e.g., call schedule record 106a) to identify the participant(s) and any other features (e.g., the duration) of the current call (step 210).

The server establishes a phone call between the user 110 and the identified participant(s) in the current call (step 212). In the present example, the server 102 establishes a phone call between the user 110 and Participant A 120a, who uses telephone 122a. Note that the attendant 116 may hang up at any time after issuing the initiation command 118.

Figure 3B:
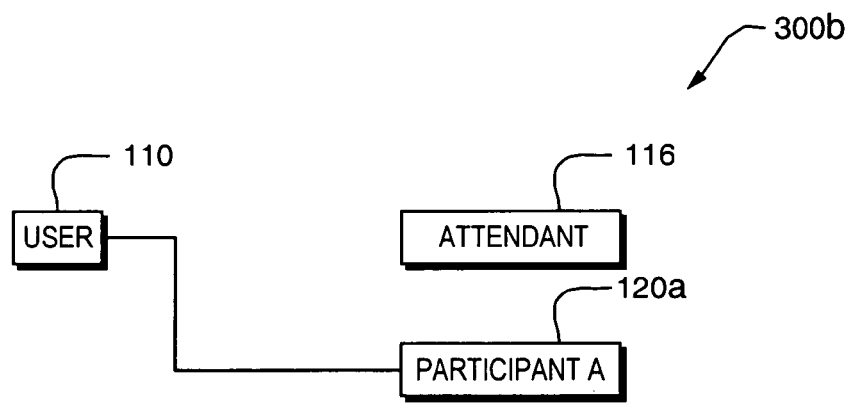

Referring to FIG. 3B, a diagram 300b is shown illustrating the state of the call chain after performance of step 212 in FIG. 2. At this point, the user 110 is connected to Participant A 120a.

The user 110 and Participant A carry on the first telephone call. At some point, the first telephone call terminates. This may happen in any of a number of ways. For example, the first telephone call may terminate when Participant A 120a hangs up telephone 122a. Alternatively, for example, the server 102 may monitor the first telephone call and automatically terminate it when its duration has exceeded the duration 108b specified by call schedule record 106a. More generally, the expiration of the predetermined duration 108b is merely one example of a predetermined termination event associated with the current call that the server 102 may detect, and in response to which the server 102 may terminate the current call.

As yet another example, the server 102 may terminate the current call in response to a request from another party to establish a call with the user 110. For example, if Participant B 120b needs to speak with user 110 sooner than planned, Participant B 120b may send a request 124a to the server 102 to intervene in the call chain. In response to the request, the server 102 may terminate the current call between Participant A 120a and the user 110 and establish a call between Participant B 120b and the user 110.

Participant B 120b may send the request 124a in any of a variety of ways. For example, Participant B 120b may send the request 124a by entering a special feature code into telephone 122b, followed by the telephone number or extension of the participant (e.g., Participant A 120a) from whom the call is to be retrieved.

In another embodiment, the attendant 116 may send a request 124b to the server 102 to intervene in the call chain. In response to the request, the server 102 may terminate the current call between Participant A 120a and the user 110 and establish a call between the attendant 116 and the user 110.

In yet another embodiment, a third party 126, such as a supervisor, may send a request 124c to the server 102 to intervene in the call chain. In response to the request 124c, the server 102 may terminate the current call between Participant A 120a and the user 110 and establish a call between the attendant 116 and the third party 126. Note that this is an example in which the request 124c is made by someone who is not the attendant 116 and who is not in the call chain defined by the call chain record 104a.

In any of these examples, the server 102 may respond to the call retrieval request by creating a conference call between the requester and the current participants in the call. For example, if the attendant 116 sends the request 124b to the server 102 to intervene in the call chain, the server 102 may respond not by terminating the current call between Participant A 120a and the user 110, but instead by adding attendant 116 to the call (i.e., creating a conference call among the user 110, Participant A 120a, and the attendant 116).

Figure 3C:
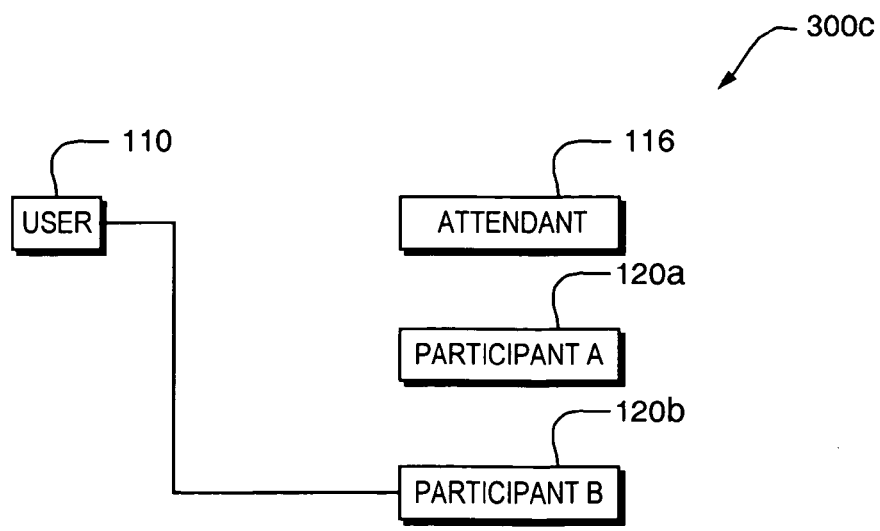

Regardless of how the first telephone call is terminated, once the first telephone call is terminated, the server 102 attempts to identify the next participant in the call chain (step 216). The server 102 may do this by reference to the call chain 104a record. If the call chain record 104a specifies that there are additional links (participants) in the call chain, the server 102 identifies the next call in the chain as the "current" call and updates the current call pointer 130 accordingly (step 218). In the present example, the next call in the chain would be the call defined by call schedule record 106b, which defines a call with Participant B 120b. Referring to FIG. 3C, a diagram 300c is shown illustrating the state of the call chain after the second time step 212 in FIG. 2 is performed. At this point, the user 110 is connected to Participant B 120b.

The server 102 repeats steps 210-216 for the new current call. In the present example, this would involve identifying Participant B 120b as a participant in the current call and identifying any other features of the call defined by call schedule record 106b (step 210), establishing (or attempting to establish) a call between the user 110 and Participant B 120b (step 212), and identifying termination of the call between the user 110 and Participant B 120b (step 214).

Note that during the call between user 110 and Participant B 120b, the Participant A 120a may send a request 124d to the server 102 to intervene in the call chain. In response to the request 124d, the server 102 may terminate the current call between Participant B 120b and the user 110, and establish a call between Participant A 120a and the user 110. Furthermore, the server 102 may identify that Participant A 120a is the previous participant in the call chain, and move the current call pointer 130 back to point to the call schedule record 106a for Participant A 120a. As a result, when the call between Participant A 120a and the user 110 terminates, the user 110 may again be connected to Participant B 120b.

Figure 3D:
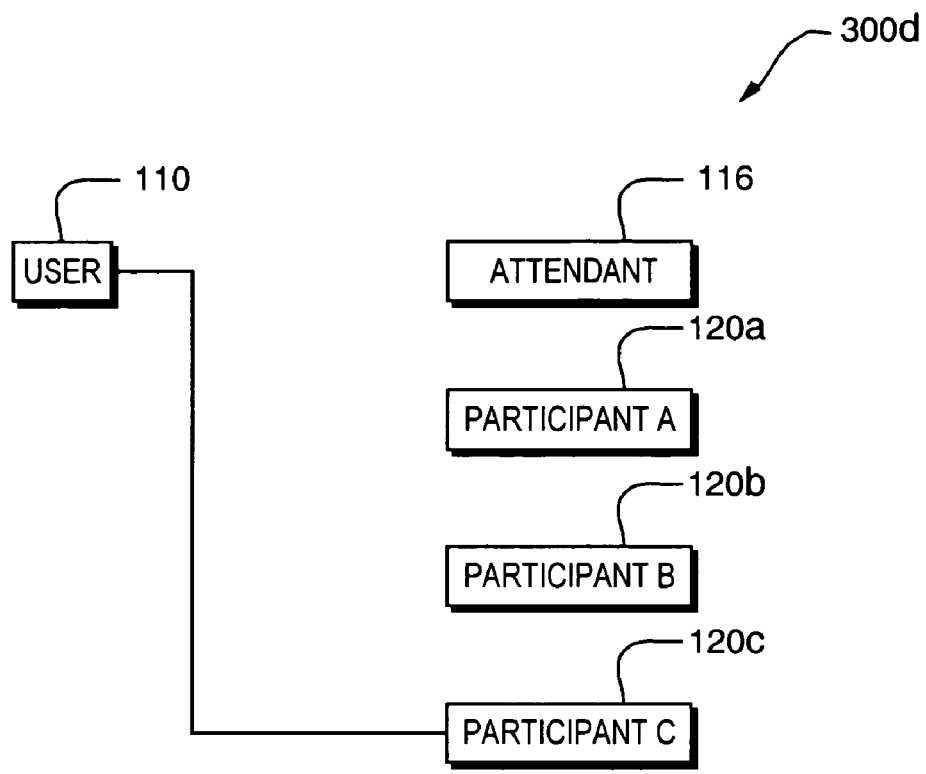

Referring to FIG. 3D, a diagram 300d is shown illustrating the state of the call chain when the user 110 is eventually connected to Participant C 120c. After the user 110 has terminated the call with the final participant in the call chain (in this example, Participant C 120c), the server 102b may reconnect the user 110 back to the attendant 116 (step 220). This is not, however, required. Alternatively, for example, the user 110 may be disconnected from the system 100 upon termination of the last call in the call chain.

The call chain record 104a may, for example, include a parameter 132 specifying one or more call chain termination rules. The parameter 132 may, for example, indicate what action the server 102 is to take upon termination of the call chain. For example, the parameter 132 may specify that the server 102 is to transfer the user 110 to the attendant 116 upon termination of the call chain, or that the server 102 is to terminate the call with the user 110 upon termination of the call chain. If the call chain termination parameter 132 is used in this way, the server 102 may determine which action to take in step 220 based on the value of the parameter 132.

As another example, the parameter 132 may indicate whether the server 102 is to allow participants in the call chain to terminate the chain. For example, the parameter 132 may specify that the server 102 is to prohibit Participant A 120a from terminating its call with the user 110 until expiration of the duration 108b specified by call schedule record 106a, or until the attendant 116 terminates the call. As another example, the parameter 132 may specify that the server 102 is to prohibit Participant A 120a from transferring its call with user 110 to another party or from putting the call on hold.

Although in the example shown in FIG. 1 the parameter 132 is associated with and applied to the call chain record 104a as a whole, this is not a requirement of the present invention. Alternatively, for example, a distinct call chain termination parameter 132 may be associated with each of the call schedule records 106a-c, thereby specifying different call chain termination rules for different participants in the chain. It may be desirable, for example, to enable a supervisor to terminate the call chain but not to enable other participants to terminate the call chain.

As yet another example, the call chain termination parameter 132 may be associated with all call chain records in the server 102. The various alternatives just described may be combined with each other. For example, the server 102 may specify a default value for the call chain termination parameter 132, which may be overridden by a particular call chain record and/or call schedule record. The same is true of other parameters described herein.

It is possible that when the server 102 attempts to establish a call between the user 110 and the specified participant(s) that the participant(s) will not pick up the phone, and that as a result the attempt to establish the call will fail. The server 102 may respond to such a failed call attempt in any of a variety of ways. The call chain record 104a may include a parameter 134 specifying one or more failed call rules. The parameter 134 may, for example, indicate what action the server 102 is to take when an attempt to establish a call within the call chain fails. For example, the parameter 134 may specify that the server 102 is to skip step 214 and thereby move on to the next participant(s) in the call chain, if any, if the attempt to establish the current call in the chain fails. Alternatively, for example, the parameter 134 may specify that the server 102 is to forward the call to the attendant 116 if the attempt to establish the current call in the chain fails. As described above, the failed call response may be specified per-server, per-call chain, per call, or any combination thereof.

It may be desirable to allow a participant to a call to remain on the call for some period of time after the next participant in the chain has joined the call. For example, it may be desirable for Participant A 120a to remain on the call with user 110 for some period of time after Participant B 120b has joined the call so that, for example, Participant A 120a can introduce the user 110 to Participant B 120b. Participant A 120a may then leave the call, leaving the user 110 in communication with Participant B 120b. This period of time is referred to herein as an "overlap" period.

Figure 3E:
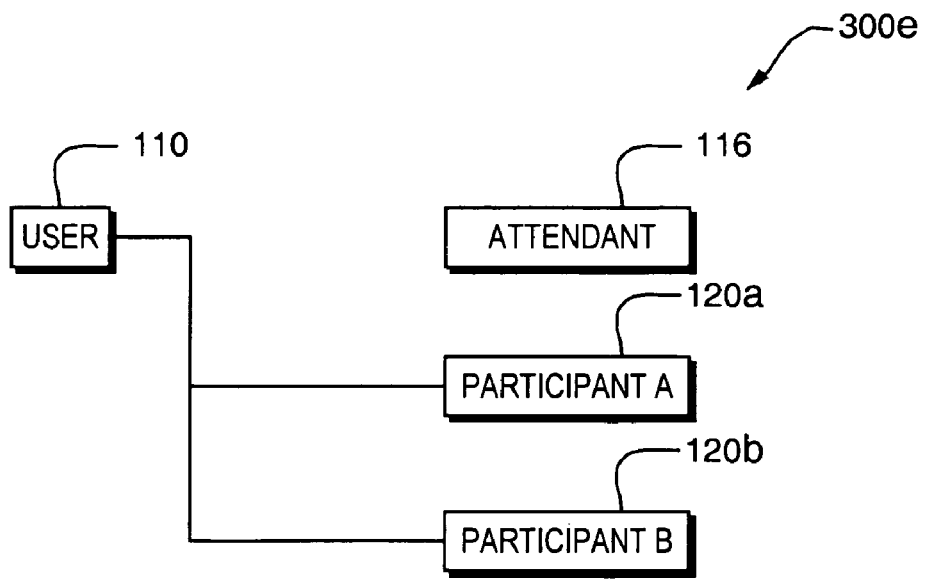

For example, referring to FIG. 3E, a diagram 300e is shown illustrating the state of the call chain after the second time step 212 in FIG. 2 is performed, according to another embodiment of the present invention. As shown in FIG. 3E, the user 110 may be connected temporarily to both Participant A 120a and Participant B 120b in a conference call. When the overlap period is complete (as may occur, for example, upon the expiration of a predetermined overlap period duration or when Participant A 120a hangs up), the user 110a remains connected to Participant B 120*b*, as shown and described above with respect to FIG. 3C.

The overlap period may be implemented, for example, by providing the call chain record 104*a* with a parameter 136 specifying one or more overlap transition rules. The parameter 136 may, for example, indicate whether the server 102 is to create an overlap period between each of the calls in the call chain defined by call chain record 104*a*. As described above, the overlap period may be enabled on a per-server, per-call chain, or per-call basis, or any combination thereof.

Figure 5:
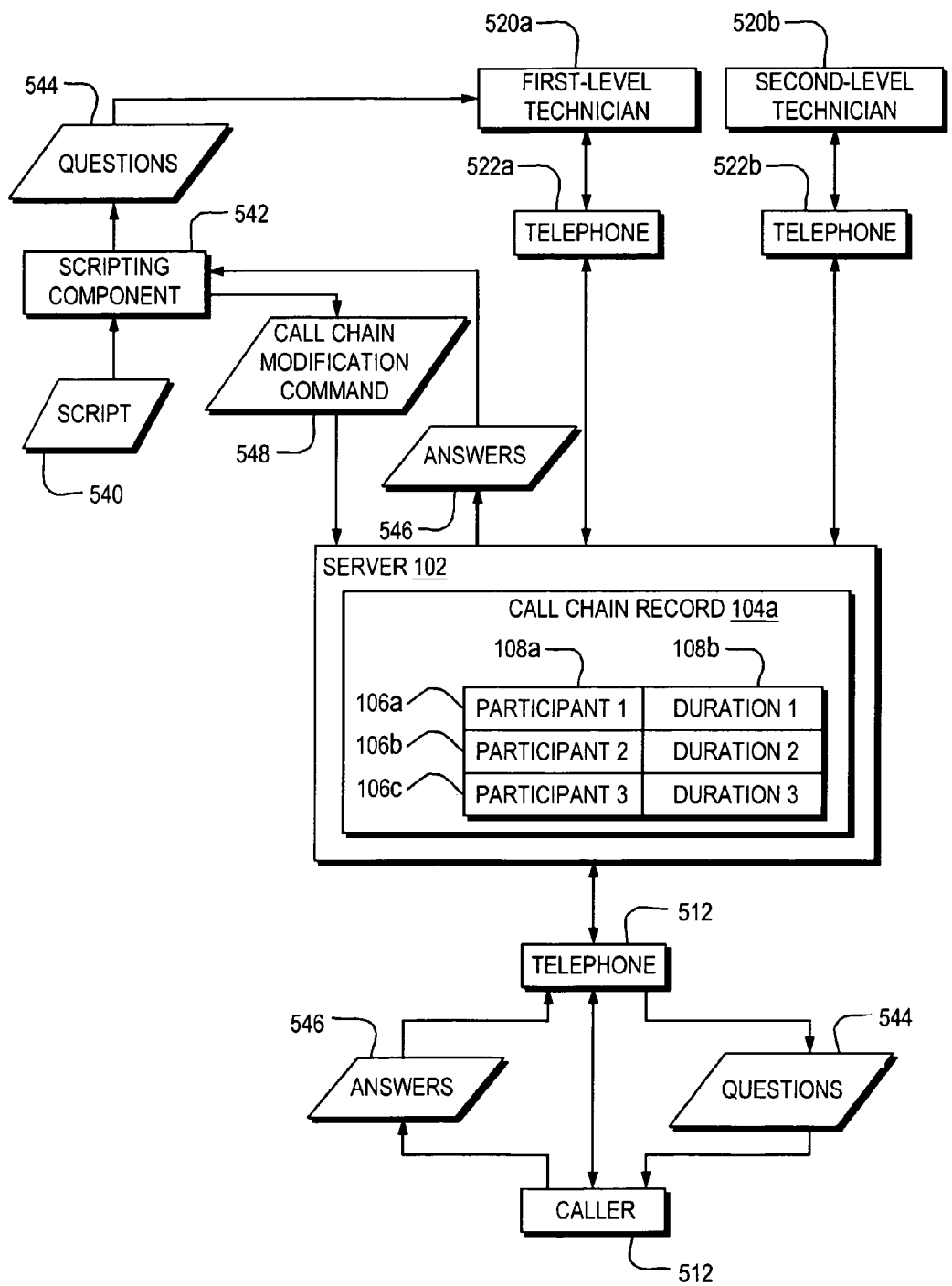
FIG. 5 is a block diagram of a system for dynamically modifying a call chain according to one embodiment of the present invention.

Some of the examples described above involve call chains that are defined statically in the call chain record 104*a*. The call chain may, however, be modified dynamically. For example, referring to FIG. 5, a block diagram is shown of a system 500 for dynamically modifying a call chain according to one embodiment of the present invention. In connection with FIG. 5, consider an example scenario involving a call center in which a first-level service technician 520*a* is provided with a questions 544, defined by a script 540, for the service technician 520*a* to ask a caller 510.

A computer-implemented scripting component 542 may provide the questions 544 to the technician 520*a* in a predefined sequence. The technician 520*a*, using telephone 522*a*, may provide the questions 544 to the caller 510 (who uses telephone 512). As the caller 510 provides answers 546 to the questions 544, the answers 546 may be provided to the scripting component 542, either using an automatic speech recognizer, or by the technician 520*a* typing the caller's answers 546. There are well-known techniques that the scripting component 542 may use to select the next set of questions 544 to ask depending on the answers 546 provided by the caller 510.

In embodiments of the present invention, the server 102 may modify the call chain record 104*a* automatically in response to the answers 546 provided by the caller 510. For example, in response to receiving a particular one of the answers 546, the scripting component 542 may issue a call chain modification command 548 to the server 102, in response to which the server 102 may modify the call chain record 104*a*. The call chain modification command 548 may modify the call chain record 104*a* in any way, such as by adding or removing participants from the call chain, changing the order of participants in the call chain, or retrieving the call to a particular participant in the call chain. Additionally or alternatively, the technician 520*a* may provide the call chain modification command 548 to the server 102 to modify the call chain record 104*a* in response to the answers 546 provided by the caller 510.

For example, when a call is received from the caller 510, a default call chain may be established, as defined by the call chain record 104*a*. Consider an example in which the default call chain consists of a first level of support (provided by the first-level technician 520*a*), followed by a call with a customer satisfaction survey person. Now assume that the first level technician 520*a* asks the caller 510 the first two questions 544 in the script 540, namely: "What type of product are you calling about?" followed by "What model number?" If the first question is answered with "wireless" and the second question is answered with "model xzy," the call chain record 104*a* may be modified to insert the telephone number of a second level support technician 520*b* (available at telephone 522*b*) who understands the wireless product having model number xyz.

The first level technician 520*a* may continue to ask more questions 544 about the nature of the problem. If the first level technician 520*a* is unable to solve the caller's problem, the first level technician 520*a* may hang up. In response, the server 102 may automatically established a call between the caller 510*a* and the second level technician 520*b*. These are merely examples of ways in which a call chain may be modified dynamically.

Figure 4B:
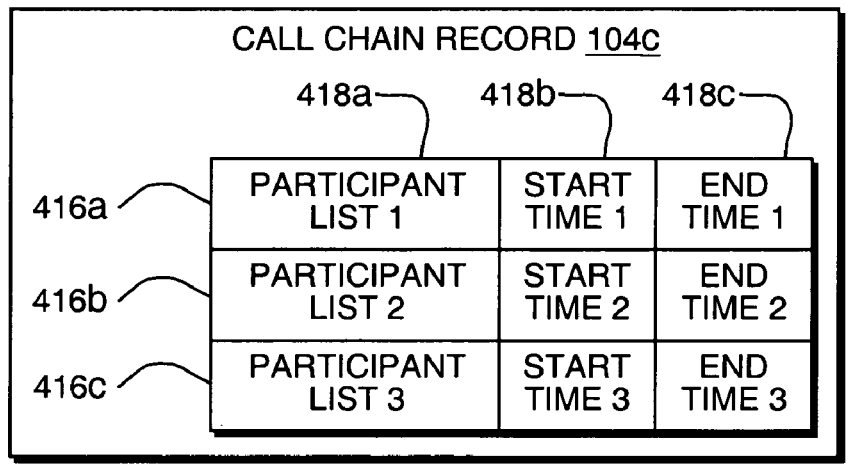
Figure 4C:
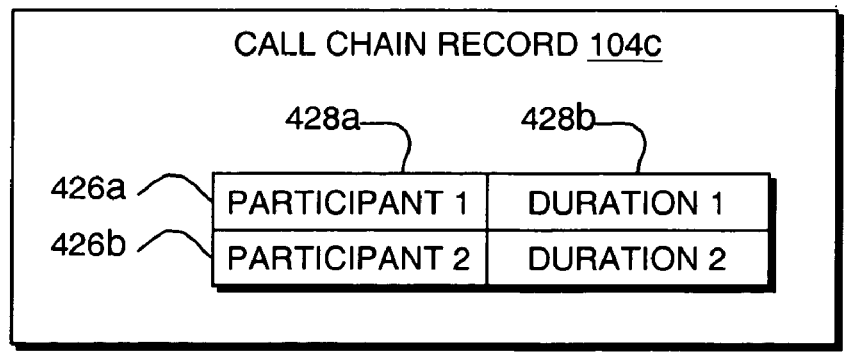

A call chain may, for example, be modified dynamically in other ways. For example, consider a situation in which Participant C 120*c* is not available when the attendant 116 configures the call chain record 104*a*. As a result, assume that the attendant 116 does not include Participant C 120*c* in the call chain. In such a situation, the call chain record 104*a* may be as shown in FIG. 4C. If, however, Participant C 120*c* becomes available while the call chain defined by call chain record 104*a* is in progress, Participant C 120*c* may issue a call chain addition request 138, requesting that Participant C 120*c* be added to the call chain. Participant C 120*c* may issue the request 138 in any of a variety of ways, such as by dialing a predetermined feature code on the telephone 122*c*.

In response to the request 138, the server 102 may add Participant C 120*c* to the call chain. For example, Participant C 120*c* may be appended to the call chain, whereby the call chain record 104*a* may appear as shown in FIG. 1. Alternatively, for example, the server 102 may interpret the request 138 as a call retrieval request and immediately retrieve the call to Participant C 120*c*. As an example of another alternative, instead of responding automatically to the request 138, the server 102 may alert the attendant 116 to the request by Participant C 120*c* to be added to the call chain. The attendant 116 may then provide the server 102 with a command, such as a command indicating that Participant C 120*c* should be added to the end of the call chain.

In conjunction with any of the techniques disclosed herein, the server 102 may display (to the attendant 116 and/or any of the participants in the call chain) information about the current status of the call chain. For example, the server 102 may transmit to the attendant 116 (through, for example, the telephone 114 or a computer connected to the server 102) the following information: (1) the identities (e.g., names and telephone numbers) of the participants to the current call in the call chain; (2) the time left in the current call in the call chain; (3) the total time left in the call chain; and (4) availability of the next scheduled participant in the call chain. Such information may then be displayed, for example, on an LCD of the attendant's telephone 114 or on a display screen connected to the attendant's computer. The server 102 may display an alert or otherwise signal the attendant when the end of a particular call in a call chain is approaching.

The server 102 may display to the attendant 116 such information about multiple call chains simultaneously, thereby enabling the attendant 116 to monitor the status of such call chains simultaneously. One way in which the attendant may change the sequence of calls in a call chain while a call chain is in progress is to select the desired call chain in the display, and then issue a command to change the sequence of calls in the selected chain.

The server 102 may also enable the attendant 116 (and other users) to modify the contents of call chain records (such as the call chain record 104*a*). The server 102 may, for example, display to the attendant a table displaying the list of participants, durations, and other information contained in the call chain record 104*a*. The server 102 may provide a graphical user interface through which the attendant 116 may add, remove, or edit such information, including adding and removing entire call chain records.

In general, embodiments of the present invention simplify the process of configuring and executing call chains. By enabling features of a call chain, such as the list of participants and call durations, to be stored at the server 102, the process of calling each participant in the chain in the correct sequence may be automated. This may save a significant amount of time and effort on behalf of the attendant 116, allowing the call chain to be executed without the attendant's involvement, except possibly to initiate the call chain.

The techniques disclosed herein also simplify execution of the call chain from the perspective of the user 110 and other participants 120*a*-*c*. For example, to participate in the call chain, the user 110 need simply call the attendant 116 or the first participant 120*a*. Once the call between the first participant 120*a* and the user 110 has concluded, the first participant 120*a* may connect the user 110 to the second participant 120*b* merely by hanging up the phone 122*a*. This saves the participants 120*a*-*c* both time and effort.

Furthermore, the scheduled duration of calls in the call chain may be enforced as described above. If, for example, the call between the first participant 120*a* and the user 110 exceeds its scheduled duration, the server 102 may automatically terminate the call and pass the user 110 on to the next participant 120*b* in the call chain. This feature may be used to prevent calls from falling off schedule, without the need for the attendant 116 or other person to enforce the schedule.

The techniques disclosed herein may also automate other tasks typically performed by the attendant 116 in a conventional system, such as forwarding the user 110 to the next participant in the call chain in the event that a particular participant does not pick up the telephone.

The techniques disclosed herein make it easier for a third party 126, such as a supervisor, to enter an ongoing call in a call chain. As described above, this may be difficult in conventional systems because it may be difficult to identify the current participants to a call. Using the techniques disclosed above, however, the server 102 monitors the state of each call chain at any point in time. The attendant 116, supervisor, or other party may therefore access the server to identify the current call in the call chain and force a conference into that call. In these and other ways the techniques disclosed herein facilitate configuring and executing call chains.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Also certain embodiments disclosed above used a call chain "record" 104 to record the features of a call chain, this is not a requirement of the present invention. Rather, some or all of the features of a call chain may be identified by the server 102 algorithmically, by reference to data stored outside the server 102, or in any other way.

Note that although the term "attendant" is used to refer to participant 116, the term "attendant" is not limited to a receptionist or any other kind of person. Rather, the term "attendant" is used herein generically to refer to someone who may initiate and/or manage call chains, but who need not be defined as a participant within the call chains themselves.

Although in certain examples described above the attendant 116 calls the user 110 before initiating a call chain, this is not a requirement of the present invention. Rather, for example: (1) the user 110 may call the attendant 116, who may then initiate the call chain; (2) the first participant 120*a* may call the user 110, and the first participant 120*a* may then initiate the call chain; (3) the attendant 116 may initiate the call chain, thereby causing the server 102 to establish a call between the user 110 and the first participant 120*a*, without establishing a connection between the attendant 116 and either the user 110 or the participant 120*a*; or (4) the first participant 120*a* may initiate the call chain, thereby causing the server 102 to establish a call between the first participant 120*a* and the user 110. These are merely examples of ways in which a call chain may be initiated and in which the first call in a call chain may be made.

Although certain examples described above describe a particular participant retrieving a call back to himself, alternatively a person may retrieve a call on behalf of another person. For example, if Participant A 120*a* is on a call with user 110, the third party 126 may send a request to the server 102 to extend the call to Participant B 120*b*. In response, the server 102 may terminate the call between Participant A 120*a* and user 110, and establish a call between Participant B 120*b* and user 110. In this example, the request from the third party 126 is not a request to establish a call between the user 110 and the third party 126, but rather a request to establish a call between the user 110 and another party (i.e., Participant B 120*b*).

The term "participant" as used herein may refer to one or more people. For example, the term "participant" may refer to a group of two or more people. Although certain examples provided herein may involve calls having exactly two participants, wherein each participant is a single person, this is not a limitation of the present invention. Rather, each call in a call chain may include participants comprised of any number of people. For example, referring to FIG. 4B, another embodiment of a call chain record 104*c* is shown, in which each of the call schedule records 406*a*-*c* specifies a participant 418*a*, comprising a list of people, and a duration 418*b*. Each of the participants 418*a* may specify one or more people. If a participant specifies more than one person, the corresponding call may be established as a conference call among the user 110 and all of the people specified in the list.

Furthermore, any telephone number specified in a call chain may either be a single telephone number, or a pool of telephone numbers corresponding to a pool of people having the same responsibility. The server 102 may call all of the people in the pool, and establish a call with the first person in the pool who picks up the telephone.

Although certain embodiments may be described herein as being used in conjunction with PBXs or other particular kinds of telephone systems, embodiments of the present invention are not limited to any particular kind of telephone system. For example, techniques disclosed herein may be used in conjunction with any variant of PBX systems (such as Voice Over IP (VoIP) PBX, also known as IPBX, or a hosted PBX), key systems, Plain Old Telephone Systems (POTS), DECT (Digital Enhanced Cordless Telecommunications), or IP (such as H.323 or Session Initiation Protocol (SIP)). These systems may be combined in various ways, such as by using analog telephone adapters (ATAs) to connect standard analog (POTS) telephones to VoIP networks.

Furthermore, although certain examples described herein involve telephones, embodiments of the present invention may be applied to other devices for use with telephone systems, such as fax machines, modems, multifunction printers, photocopiers, and combinations thereof.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method comprising:
   (A) identifying phone call participants, wherein a user is scheduled to call the phone call participants in a predetermined sequence, in which a first one of the phone call participants is followed by a third one of the phone call participants and the third one of the phone call participants is followed by a second one of the phone call participants;
   (B) identifying a first phone call between the user and the first one of the phone call participants in the sequence, wherein the first phone call includes an established connection between the user and the first one of the phone call participants;
   (C) during the first phone call, modifying the predetermined sequence of phone call participants so that a second one of the phone call participants follows the first one of the phone call participants and the third one of the phone call participants follows the second one of the phone call participants;
   (D) identifying a first termination event associated with the first phone call;
   (E) automatically identifying, by a computer system, the second one of the phone call participants, wherein the second one follows the first one in the sequence; and
   (F) attempting, by the computer system, to initiate a second phone call between the user and the second one of the phone call participants.

2. The method of claim 1, wherein (A) comprises identifying a record tangibly stored in a computer-readable medium, the record specifying the sequence of phone call participants.

3. The method of claim 1, wherein (E) comprises identifying a telephone number of the second one of the phone call participants, and wherein (F) comprises dialing the identified telephone number.

4. The method of claim 1, wherein (D) comprises: terminating the first phone call in response to the detection of the predetermined termination event.

5. The method of claim 1, wherein (D) comprises detecting expiration of a predetermined time period associated with the first phone call.

6. The method of claim 1, wherein (D) comprises detecting a request from the first one of the phone call participants to hang up on the first phone call.

7. The method of claim 1, wherein (D) comprises detecting a request from the second one of the phone call participants to initiate the second phone call.

8. The method of claim 1, wherein (F) comprises initiating a second phone call among the user, the first one of the phone call participants, and a second one of the phone call participants, and wherein the method further comprises:
   (G) identifying a second termination event associated with the second phone call; and
   (H) removing the first one of the phone call participants from the second phone call, whereby the user and the second one of the phone call participants remain in communication with each other on the second phone call.

9. The method of claim 8, wherein the second termination event comprises expiration of a predetermined time period associated with the second phone call.

10. The method of claim 1, wherein (B) comprises receiving an incoming phone call from the user and identifying the incoming phone call as the first phone call.

11. The method of claim 1, wherein (B) comprises:
    (B)(1) receiving an incoming phone call from the user to a person who is not in the sequence of phone call participants; and
    (B)(2) in response to receiving the incoming phone call, establishing the first phone call between the user and the first one of the phone call participants.

12. The method of claim 1, wherein (B) comprises placing an outgoing phone call from the first one of the phone call participants to the user, and identifying the outgoing phone call as the first phone call.

13. The method of claim 1, wherein (B) comprises:
    (B)(1) placing an outgoing phone call to the user from a person who is not in the sequence of phone call participants; and
    (B)(2) establishing the first phone call between the user and the first one of the phone call participants.

14. The method of claim 1, wherein (F) comprises:
    (F)(1) determining whether the attempt to initiate the second phone call has failed;
    (F)(2) if it is determined that the attempt to initiate the second phone call has failed:
    (a) identifying a third one of the phone call participants, wherein the third one follows the second one in the sequence; and
    (b) attempting to initiate a third phone call between the user and the third one of the phone call participants.

15. The method of claim 1, further comprising:
    (G) receiving a request from a person who is not in the sequence of phone call participants to join the second phone call; and (H) establishing a conference call among the user, the first participant, and the person in response to the request.

16. The method of claim 1, wherein (C) comprises:
(C)(1) receiving input from the first participant; and
(C)(2) modifying the sequence of phone call participants in response to the input.

17. The method of claim 16, wherein the first one of the phone call participants comprises a first group of at least two people, and wherein (B) comprises identifying a first phone call among the user and the first group of at least two people.

18. The method of claim 13, wherein the second one of the phone call participants comprises a single person.

19. An apparatus comprising:
first phone call participant identification means for identifying phone call participants, wherein a user is scheduled to call the phone call participants in a predetermined sequence, in which a first one of the phone call participants is followed by a third one of the phone call participants and the third one of the phone call participants is followed by a second one of the phone call participants;
first phone call identification means for identifying a first phone call between the user and a first one of the phone call participants in the sequence, wherein the first phone call includes an established connection between the user and the first one of the phone call participants;
means for modifying, during the first phone call, the predetermined sequence of phone call participants so that a second one of the phone call participants follows the first one of the phone call participants and the third one of the phone call participants follows the second one of the phone call participants;
first termination event identification means for identifying a first termination event associated with the first phone call;
second phone call participant identification means for automatically identifying the second one of the phone call participants, wherein the second one follows the first one in the sequence; and
first phone call initiation means for attempting to initiate a second phone call between the user and the second one of the phone call participants in response to an identification that the first termination event has occurred.

20. The apparatus of claim 19, wherein the first phone call participant identification means comprises means for identifying a record tangibly stored in a computer-readable medium, the record specifying the sequence of phone call participants.

21. The apparatus of claim 19, wherein the second phone call identification means comprises means for identifying a telephone number of the second one of the phone call participants, and wherein the first phone call initiation means comprises means for dialing the identified telephone number.

22. The apparatus of claim 19, wherein the first termination event identification means comprises means for terminating the first phone call in response to the detection of the predetermined termination event.

23. The apparatus of claim 19, wherein the first termination event identification means comprises means for detecting expiration of a predetermined time period associated with the first phone call.

24. The apparatus of claim 19, wherein the first termination event identification means comprises means for detecting a request from the first one of the phone call participants to hang up on the first phone call.

25. The apparatus of claim 19, wherein the first termination event identification means comprises means for detecting a request from the second one of the phone call participants to initiate the second phone call.

26. A method comprising:
(A) identifying phone call participants, wherein a user is scheduled to call the phone call participants in a predetermined sequence;
(B) identifying a first phone call between the user and a first one of the phone call participants in the sequence, wherein the first phone call includes an established connection between the user and the first one of the phone call participants;
(C) identifying a first termination event associated with the first phone call;
(D) automatically identifying, by a computer system, a first person who is not one of the phone call participants in the sequence; and
(E) attempting, by the computer system, to initiate a second phone call between the user and the first person in response to an identification that the first termination event has occurred.

27. The method of claim 26, wherein (C) comprises detecting a request from the first person to initiate the second phone call.

28. The method of claim 26, wherein (C) comprises detecting a request from a second person, different from the user and the first person, to initiate the second phone call.

29. The method of claim 28, wherein the second person is not one of the phone call participants in the sequence.

30. An apparatus comprising:
phone call participant identification means for identifying phone call participants, wherein a user is scheduled to call the phone call participants in a predetermined sequence;
phone call identification means for identifying a first phone call between the user and a first one of the phone call participants in the sequence;
termination event identification means for identifying a first termination event associated with the first phone call, wherein the first phone call includes an established connection between the user and the first one of the phone call participants;
person identification means for automatically identifying a first person who is not one of the phone call participants in the sequence; and
phone call initiation means for attempting to initiate a second phone call between the user and the first person in response to an identification that the first termination event has occurred.

31. The apparatus of claim 30, wherein the termination event identification means comprises means for detecting a request from the first person to initiate the second phone call.

32. The apparatus of claim 30, wherein the termination event identification means comprises means for detecting a request from a second person, different from the user and the first person, to initiate the second phone call.

33. The apparatus of claim 32, wherein the second person is not one of the phone call participants in the sequence.

34. A computer-implemented method comprising:
(A) identifying phone call participants, wherein a user is scheduled to call the phone call participants in a predetermined sequence, in which a first one of the phone call participants is followed by a third one of the phone call participants and the third one of the phone call participants is followed by a second one of the phone call participants;

(B) identifying a first phone call between the user and a first phone call participant, wherein the first phone call includes an established connection between the user and the first one of the phone call participants;

(C) during the first phone call, modifying the predetermined sequence of phone call participants so that a second one of the phone call participants follows the first one of the phone call participants and the third one of the phone call participants follows the second one of the phone call participants;

(D) in response to an event occurring during the first phone call, automatically selecting a second phone call participant from the predetermined sequence;

(E) identifying a first termination event associated with the first phone call;

(F) attempting, by a computer system, to initiate a second phone call between the user and the second phone call participant in response to an identification that the first termination event has occurred.

35. The method of claim 34, wherein (A) comprises identifying a record tangibly stored in a computer-readable medium, the record specifying the first phone call participant.

36. The method of claim 34, wherein the event comprises receipt of input from the user.

37. An apparatus comprising:

phone call participant identification means for identifying phone call participants, wherein a user is scheduled to call the phone call participants in a predetermined sequence, in which a first one of the phone call participants is followed by a third one of the phone call participants and the third one of the phone call participants is followed by a second one of the phone call participants;

phone call identification means for identifying a first phone call between the user and a first phone call participant, wherein the first phone call includes an established connection between the user and the first one of the phone call participants;

means for modifying, during the first phone call, the predetermined sequence of phone call participants so that a second one of the phone call participants follows the first one of the phone call participants and the third one of the phone call participants follows the second one of the phone call participants;

phone call participant selection means for automatically selecting, in response to an event occurring during the first phone call, the second phone call participant;

termination event identification means for identifying a first termination event associated with the first phone call; and phone call initiation means for attempting to initiate a second phone call between the user and the second phone call participant in response to a determination that the first termination event associated with the first phone call has occurred.

38. The apparatus of claim 37, wherein the phone call participant identification means comprises means for identifying a record tangibly stored in a computer-readable medium, the record specifying the first phone call participant.

39. The apparatus of claim 38, wherein the record specifies a sequence of phone call participants including the first phone call participant followed by a participant other than the second phone call participant.

* * * * *